United States Patent
Fieber et al.

(10) Patent No.: US 11,829,574 B2
(45) Date of Patent: Nov. 28, 2023

(54) MEDIA PLATFORM AND METHOD FOR PROVIDING STRUCTURED ACCESS TO MEDIA CONTENT

(71) Applicant: L&A Video Consulting GmbH, Mannheim (DE)

(72) Inventors: Lukas Fieber, Mannheim (DE); Aditya Pasarakonda, Hamburg (DE)

(73) Assignee: L&A Video Consulting GmbH, Mannheim (DE)

( * ) Notice: Subject to any disclaimer, the term of this patent is extended or adjusted under 35 U.S.C. 154(b) by 0 days.

(21) Appl. No.: 17/867,305

(22) Filed: Jul. 18, 2022

(65) Prior Publication Data
US 2023/0037009 A1    Feb. 2, 2023

(30) Foreign Application Priority Data

Jul. 30, 2021 (EP) .................................... 21188913

(51) Int. Cl.
| | |
|---|---|
| G06F 3/0482 | (2013.01) |
| G06F 3/04817 | (2022.01) |
| G06F 16/48 | (2019.01) |
| H04L 9/40 | (2022.01) |

(52) U.S. Cl.
CPC ........ *G06F 3/04817* (2013.01); *G06F 3/0482* (2013.01); *G06F 16/48* (2019.01); *H04L 63/101* (2013.01)

(58) Field of Classification Search
CPC .... G06F 3/04817; G06F 3/0482; G06F 16/48; H04L 63/101
See application file for complete search history.

(56) References Cited

U.S. PATENT DOCUMENTS

| | | | |
|---|---|---|---|
| 8,826,117 B1* | 9/2014 | Junee ..................... | G11B 27/34 715/230 |
| 8,984,405 B1* | 3/2015 | Geller ................... | G06F 3/0482 715/753 |
| 9,557,896 B1* | 1/2017 | Toff ........................ | G06F 16/40 |
| 9,961,402 B1* | 5/2018 | Balasubramanian ....................... | H04N 21/266 |

(Continued)

OTHER PUBLICATIONS

Extended European Search Report dated Jan. 14, 2022 for European Application No. 21188913.4, 3 pgs.

*Primary Examiner* — Hien L Duong
(74) *Attorney, Agent, or Firm* — SEED INTELLECTUAL PROPERTY LAW GROUP LLP

(57) ABSTRACT

A method for providing structured access to media content on a media platform includes providing a user interface including a dashboard with a plurality of interactive elements. The interactive elements are configured using a design area, wherein access to the design area is granted according to a role of a user operating the user interface. At least one of the interactive elements is associated with media content using an upload area of the user interface, wherein access to the upload area is granted according to a role of a user operating the user interface. The media content is uploaded from a terminal device operated by the user to the media platform. Access to the media content is enabled using the interactive elements, wherein each interactive element provides access to the associated media content. Moreover, a system with a server device providing a media platform, and client devices, is disclosed.

15 Claims, 7 Drawing Sheets

(56) References Cited

U.S. PATENT DOCUMENTS

| | | | |
|---|---|---|---|
| 11,334,555 B2* | 5/2022 | Strong | G06F 16/2365 |
| 11,334,779 B1* | 5/2022 | Schwarzberg | G06K 19/06037 |
| 2006/0242178 A1* | 10/2006 | Butterfield | G06F 16/447 |
| 2009/0282337 A1* | 11/2009 | Tilley | G06F 16/70 715/719 |
| 2010/0306656 A1* | 12/2010 | Moloney | G06F 16/70 715/723 |
| 2011/0047484 A1* | 2/2011 | Mount | G06Q 10/10 715/753 |
| 2011/0246889 A1 | 10/2011 | Moore | |
| 2011/0307302 A1* | 12/2011 | Perna | G06Q 10/06393 705/7.39 |
| 2012/0089610 A1* | 4/2012 | Agrawal | G06Q 50/01 707/741 |
| 2013/0174015 A1* | 7/2013 | Jeff | G06F 16/958 715/234 |
| 2014/0096020 A1* | 4/2014 | Grosz | G06F 16/51 715/738 |
| 2014/0096040 A1* | 4/2014 | Grosz | G06F 40/186 715/753 |
| 2015/0261411 A1* | 9/2015 | Snook | G06F 3/04817 715/751 |
| 2015/0295914 A1* | 10/2015 | Kelishadi | G06F 3/0482 |
| 2015/0347969 A1* | 12/2015 | Davis | G06F 16/958 715/745 |
| 2017/0064277 A1 | 3/2017 | Imbruce et al. | |
| 2018/0114277 A1* | 4/2018 | Whitmer | G06F 21/50 |
| 2018/0189734 A1* | 7/2018 | Newhouse | G06F 16/25 |
| 2018/0349107 A1* | 12/2018 | Lundeen | G06F 8/34 |
| 2020/0168115 A1* | 5/2020 | Bell | G06Q 50/20 |
| 2021/0016151 A1* | 1/2021 | Bokowski | H04L 67/10 |
| 2021/0150587 A1* | 5/2021 | Rizvi | G06Q 30/0244 |
| 2022/0245589 A1* | 8/2022 | Akers | G06Q 10/103 |
| 2022/0292543 A1* | 9/2022 | Henderson | G06Q 30/0269 |

* cited by examiner

Fig. 6

MEDIA PLATFORM AND METHOD FOR PROVIDING STRUCTURED ACCESS TO MEDIA CONTENT

BACKGROUND

Technical Field

The present disclosure relates to a method for providing structured access to media content on a media platform, and, in particular, to a system implementing a respective media platform.

Description of the Related Art

Media, such as audio or video content, may be typically presented online on media platforms or in similar environments by presenting a user interface with visual representations of media and providing a playback or download of the media when clicking on a respective visual representation in the user interface. Such media platforms typically enable that media can be associated with categories or preferences such that users can retrieve content of interest. For example, a user may log in to a media platform and may browse a catalogue of available media content to identify and playback a desired media content. Even though there might be user-specific limitations, for example, due to age restrictions, the media content on available media platforms is typically presented to all users of the media platform. To simplify access to content, media platforms typically generate profiles for individual users that indicate preferences or interests to automatically make suggestions of media content that might be of interest for particular users. However, due to the amount of media content on media platforms, it is generally difficult for a user to directly identify relevant content.

Other systems, such as content management systems, enable an author to structure content and information to generate pages that resemble classical webpages. The provided content can be perceived and linked content can be downloaded. Yet, the content is typically static and does not change frequently since the creation of webpages using such systems can be difficult.

Thus, there is a need in the art for a method and a system that provide a simplified and structured access to media content on a media platform in a flexible manner.

BRIEF SUMMARY

Disclosed herein is a method for providing structured access to media content on a media platform, a media platform, and a system implementing a media platform.

The method for providing structured access to media content on a media platform according to the present disclosure comprises providing a user interface including a dashboard with a plurality of interactive elements, configuring the plurality of interactive elements of the dashboard using a design area of the user interface, wherein access to the design area is granted according to a role of a user operating the user interface, associating at least one of the plurality of interactive elements with at least one media content using an upload area of the user interface, wherein access to the upload area is granted according to a role of a user operating the user interface and wherein the at least one media content is uploaded from a terminal device operated by the user to the media platform, and enabling access to the media content using the plurality of interactive elements of the dashboard, wherein each interactive element provides access to the associated at least one media content.

The method allows for a flexible processing of media content that is provided via the media platform in a structured manner. Users can be assigned roles and according to the respective role, a user may access the design area, the upload area and/or the dashboard. It is known in the art that a role may specify permissions and/or restrictions for a user in an environment, such as on the media platform. The role of a user may, for example, specify that the user can access any one of the upload area and/or the design area or other restricted areas of the user interface.

In a first step, the design area can be used by a user having respective permissions according to their role to specify interactive elements for the dashboard. This enables a specification of a layout for the dashboard in a flexible manner. In a further step, the upload area can be used by the same or another user having respective permissions according to their role, to upload media content and to associate the defined interactive elements with the uploaded media content.

It is to be understood that the further step can be performed sequentially after the first step on or in parallel with the first step. For example, a first user having permissions to design the dashboard can set up interactive elements for the dashboard and a second user having permissions to upload content may use the upload area to associate the interactive elements with uploaded content. Subsequently or in parallel, the same or another user having respective permissions may use the dashboard and interact with the interactive elements to access the associated media content. This enables a simplified and structured access to uploaded media content.

Thus, the method according to the present disclosure enables a direct and simplified setup of a dashboard for the media platform, association of uploaded media content with respective interactive elements, and consumption of the media content via the dashboard. Moreover, the method provides for a secure access to the media platform by specifying permissions and/or restrictions for individual users that may design the dashboard and/or configure the dashboard with media content.

Optionally, in a preferred embodiment, the method further comprises uploading annotated media content with a plurality of tags specifying a plurality of portions of the annotate media content, and associating a first interactive element of the plurality of interactive elements with the annotated media content using at least a first tag of the plurality of tags. The method may further comprise associating a second interactive element of the plurality of interactive elements with the annotated media content using at least a second tag of the plurality of tags. Preferably, the same media content may be associated with a plurality of interactive elements of the dashboard, such that by interacting with the respective first or second interactive elements, only those portions of the media content are provided that are linked to the respective first or second interactive element. This association can be achieved by associating the first and/or second media content with respective tags that identify portions of the media content or media components of the annotated media content. Media content with tags referencing media components of the media content may be generally referred to as annotated media content. It is to be understood that the annotated media content may include media content or one or more media components in combination with a data structure that specifies the one or more tags. Thus, the annotated media content may represent a container data structure including the media content or the one or more media components, and the data structure. The data structure may be defined in a markup language, such as XML, or in any other structured or dedicated format.

The one more tags may, for example, specify portions of the media content or the media components relating to the same category or content. For media content referring to sport activities, a tag may, for example, specify proportion of the media content that may show a goal or a try or any other standardized part of the sports activity. Accordingly, the first or the second interactive element may be associated with these parts of the sports activity as identified by the respective tag. For example, the first interactive element may provide portions of the media content showing a goal or a try within a game or match. The second and/or the first interactive element may be associated with any other standardized parts or situations of the sports activity, such as lineout, scrum, penalty or the like. It is to be understood that the media content is not limited to sports activities only. For media content in the medical area, a tag may, for example, specify proportions of the media content that may show a sequence of a surgical intervention. It is to be understood that tags may be defined for any media content in any area and that respective tags may be defined in the data structure and linked to portions of the content that can be characterized by the respective tags. The combination of media and data structure with tags define annotated media content.

Preferably, the first interactive element provides access to at least one first portion of the plurality of portions of the annotated media content specified by at least the first tag, and the second interactive element provides access to at least one second portion of the plurality of portions of the annotated media content specified by at least the second tag. It is to be understood that portions of the annotated media content may be accessed by any number of interactive elements, such as by one, two, three, four or more interactive elements that may each be configured with respective tags identifying the portions of the annotate media content. Similarly, if the first or second tag or any other tag of the data structure of the annotated media content specify a plurality of portions of the annotated media content, the first or the second or any other further interactive elements may directly link to all of the plurality of portions of the annotated media content as specified by the first or second or any other tag. The respective portions may be provided in a sequential manner as one media item or as a plurality of individual media items.

According to another embodiment, the method further comprises associating the first interactive element with at least another first tag of the plurality of tags, and associating the second interactive element with at least another second tag of the plurality of tags. Following an upload of the annotated media content, any of the interactive elements of the dashboard can be associated with any of the plurality of tags of the annotated media content. Moreover, it is to be understood that any of the interactive elements of the dashboard can be associated with a plurality of media contents and/or a plurality of tags of annotated media content(s) uploaded via the upload area in any combination.

In yet another embodiment, said associating at least one of the plurality of interactive elements with at least one media content using an upload area of the user interface further includes associating the at least one media content with one or more users of the media platform, wherein access to the at least one media content is enabled only for the one or more associated users. This enables a specification of exclusive elements, which may be accessed via respective interactive elements by a dedicated group of users or individual users. The exclusive elements may also provide access to different media content for different groups of users or for different individual users. Example, a first group of users or a first user may use an interactive element to access a first media content, while a second group of users or a second user may use the same interactive element to access another media content.

According to a particular embodiment, at least one of the media content is related to at least one sports activity. Preferably, the at least one media content includes annotated media content related to the at least one sports activity. Media content may be related to any kind of sports activity. Annotations in the media content may reflect standardized sequences or situations within the sports activity. For example, the annotations may include tags and the tags may define a goal, a try, a touchdown, a lineout, a corner kick, a kick-off or any other event or standardized situation of the sports activity. Moreover, the media content may be pre-processed by a coach or other responsible personnel, which may, for example, use an analysis software or service, to identify portions of the media content that may be relevant to players, coaching staff or other stakeholders related to the respective sports activity. Thus, the media platform may enable structured access to annotated sports content that may be consumed for educational, coaching or training purposes. Yet, it is to be understood that media content provided via the media platform can be related to application areas other than sports activities, such as medical, engineering, or financial areas that may require structured access to media for training, instructing, construction, analysis or educational purposes. Moreover, it is to be understood that the media platform can be related to a plurality of different areas and the present disclosure is not limited by a particular application area or media content.

According to another embodiment, the role includes one or more of an administrator role, a designer role, an uploader role, and/or a viewer role. The role can be generally understood as specifying permissions and/or restrictions for individual users when accessing the media platform and/or the user interface specifying the dashboard. In media platforms related to sports activities, the roles may, for example, specify permissions for coaching or coaching staff as well as for team members or players. Coaches may be assigned the uploader role and/or the designer role in order to enable the coaching staff to set up the dashboard and upload respective media. Team members may be assigned the viewer role in order to enable the team members to consume the provided media content in an interactive and structured manner.

In yet another embodiment, the method further comprises specifying one or more parameters related to the plurality of interactive elements using the design area. Preferably, the plurality of interactive elements are displayed or otherwise provided on the dashboard according to the specified one or more parameters.

According to one embodiment, the one or more parameters include one or more of coordinates, color, shape, filters, interactive properties, and time constraints. The one or more parameters can define a look and feel and the behavior of the interactive elements when presented on the dashboard. For example, at least one parameter may define a position and orientation of an interactive element on the dashboard. Another at least one parameter may define size, shape, structure and other appearance factors of the interactive element. Other parameters may define a filter that may specify how the interactive element combines with other elements on the dashboard, e.g., how the interactive element overlays a background image of the dashboard. The one or more parameters may further define interactive properties, such as responsiveness of the interactive elements, presentation of further context menus, playback of sound or other media content responsive to interaction of a user, and the like. Moreover, the one or more parameters may define time constraints, which may, for example, specify a duration of time of availability of the interactive element or time periods, when the interactive element is available in the dashboard, such as on a particular day or time.

According to another embodiment, the method further comprises uploading a media content using the upload area, wherein the media content is uploaded to at least one server device providing distributed storage. The method may further include saving the uploaded media content to the distributed storage. During interaction with the upload area to upload media content, the media platform may (automatically) determine the at least one server device, which may be suitable for storing the uploaded media content. For example, the at least one server device may be identified according to workload of the distributed storage, usage of the distributed storage, available storage space on the distributed storage, and the like. The distributed storage may also be selected according to regional parameters, which may prioritize server devices in proximity to the uploading user and/or a group of consumers of media content on the media platform, such as users having the viewer role.

According to a particular embodiment, at least one media content includes one or more of text documents, multimedia documents, images, audio data, video, and virtual reality content. The media content may include any kind of media. This may be traditional textual, audio or video data, images and other media content, in any combination. Combined media content of different types may also be referred to as multimedia content or respective documents. Moreover, the media content is not limited to an audio/visual presentation in 2 dimensions and may include multidimensional media content, such as 3D or 4D content or content referring to other modalities, such as haptics. The media content may be suitable for playback via 2D or 3D devices or multimodal immersive devices, such as virtual reality, augmented reality or mixed reality devices. Accordingly, the media content may be referred to as virtual reality, augmented reality or mixed reality content.

According to another embodiment, at least one media content includes media content and a data structure specifying one or more tags, each tag referencing at least one portion of the media content of the at least one media content. Further to data that may specify the type and parameters of the content, including modality, timing, resolution and the like, in any combination, which may be specified, for example, in a header of the at least one media content, the at least one media content may include media content and one or more data structures which may define tags or other metadata or annotations that may specify and/or group portions of the media content. The at least one media content with tags may also be referred to as annotated media content throughout this disclosure. The media content of the at least one media content may also be referred to as one or more media components. Thus, the annotated media content may include one or more media components (the media content) in combination with one or more data structures in any combination to form the annotated media content (the at least one media content).

In yet another embodiment, based on a selected tag of the one or more tags, the media platform provides access to the respective at least one portion of the media content (of the one or more media components) of the at least one media content (the annotated media content). According to an association of the interactive elements with individual tags referring to the media content, the media platform may preprocess the uploaded annotated media content to directly provide access to the associated portions of the media content (of the one or more media components) of the annotated media content. This may increase access time while saving storage space since the annotated media content can be uploaded only once and access to respective portions of the media content may be controlled by associating respective tags with interactive elements.

According to a particular embodiment, the method further comprises analyzing by or using an analysis component. The analysis component may be an analysis service or an analysis software which may be executed on the media platform or on any other dedicated processing component on the same computing device or in a distributed environment. For example, the analysis component may be provided as a "Software as a service," SaaS component, which can be assessed by the media platform. The analysis component may be used to automatically, semi-automatically or manually generate metadata, such as one or more tags or respective annotations, that specify portions of the media content that have similarities that may be characterized by the associated metadata and/or tags. An automated analysis may be performed using machine learning approaches, pattern matching or statistical approaches, in any combination. The results can be refined and checked based on rules. Accordingly, uploaded media content can be automatically processed by the analysis component to create annotated media content. Yet, it is to be understood that embodiments of the present disclosure are not limited by a particular analysis component or a respective service.

According to yet another embodiment, the analysis component provides one or more tags that specify content of the at least one media content, wherein the tags are used to filter the at least one media content to directly provide access to the specified content of the at least one media content according to a selection of the one or more tags. The media platform may use the one or more tags to pre-process the uploaded media content online and to pre-store links, pointers and/or other access data structures that enable a direct access at the referenced portions of the media content that include the content specified by the individual tags. This may be used to efficiently stream or otherwise provide the respective portions of the media content by the media platform.

In yet another embodiment, the method further comprises, when interacting with an interactive element of the plurality of interactive elements, providing a preview area, the preview area listing one or more items indicating the media content associated with the interactive element and enabling direct access to the respective media content. The interactive element may be linked to a plurality of media content items. The preview area may enable a direct link to the individual items. The preview area may be provided on the user interface, when the user interacts with the interactive element. For example, the preview area may be overlaid over the interactive element. The preview may be provided with a reduced resolution and quality to ensure a timely streaming or provision of the preview.

In a further embodiment, the interactive element is associated with a plurality of media content. The method may further comprise generating a media stream including the plurality of media content, and providing the media stream to a user of the dashboard. As soon as an interactive element is associated with a plurality of media content, the media platform may pre-process the uploaded media content to generate a media stream which may include all parts of the plurality of media content. This may speed up access to the associated media content.

According to another embodiment, the method further comprises providing a further dashboard with a further plurality of interactive elements, the further plurality of interactive elements configured to provide access to the media content associated with the plurality of interactive elements of the dashboard. The further dashboard may be set up for one or more individual users that may be provided with permissions to design the further dashboard and link the interactive elements of the further dashboard with media content that has already been uploaded for the dashboard. For example, team members of a team may use media content that has been uploaded by coaching staff to set up a personalized further dashboard for presentation purposes or any other structured access to individualized media content. The further dashboard can be accessed via a link or any other access data structure also by users that may not be registered with the media platform. Thus, a user can set up the further dashboard and freely share the structured access to the further dashboard with other users.

According to a particular embodiment, the method further comprises, for a user of the user interface, verifying an access authorization of the user based on the role to grant access to the dashboard and/or the design area and/or the upload area. The media platform may include a database of authorized users. For each authorized user, the media platform may store access credentials and roles associate to the individual users. The media platform may provide a dedicated user interface that may enable an administrator or other authorized user to assign roles to the individual users of the media platform.

The present disclosure further defines one or more non-transitory computer-readable media storing instructions thereon, wherein the instructions, when executed by one or more computing devices, configure the one or more computing devices to perform a method according to any one of the preceding embodiments. In particular, the one or more computing devices can be configured by the computer-executable instructions to provide structured access to media content on a media platform by providing a user interface including a dashboard with a plurality of interactive elements, configuring the plurality of interactive elements of the dashboard using a design area of the user interface, wherein access to the design area is granted according to a role of a user operating the user interface, associating at least one of the plurality of interactive elements with at least one media content using an upload area of the user interface, wherein access to the upload area is granted according to a role of a user operating the user interface and wherein the at least one media content is uploaded from a terminal device operated by the user to the media platform, and enabling access to the media content using the plurality of interactive elements of the dashboard, wherein each interactive element provides access to the associated at least one media content.

According to another aspect of the present disclosure, a system comprises at least one server device providing a media platform; and one or more client devices, wherein the at least one server device is configured to provide a user interface including a dashboard with a plurality of interactive elements to the one or more client devices, wherein each of the one or more client devices enable a respective user to configure the plurality of interactive elements of the dashboard using a design area of the user interface, wherein access to the design area is granted by the server device according to a role of the user operating the user interface; and associate at least one of the plurality of interactive elements with at least one media content using an upload area of the user interface, wherein access to the upload area is granted by the server device according to a role of the user operating the user interface and wherein the at least one media content is uploaded from the client device operated by the user to the media platform, wherein the at least one server device is further configured to enable access to the media content using the plurality of interactive elements of the dashboard, wherein each interactive element provides access to the associated at least one media content.

It is to be understood that the system may be configured to perform any processing according to one or more embodiments of the method in any combination.

According to one embodiment, the system further comprises a distributed storage configured to store media content and stream at least parts of the media content responsive to a request of at least one client device.

In yet another embodiment, the system further comprises an analysis component configured to analyze at least one of the media content and provide one or more tags specifying at least parts of the at least one media content, wherein the server device is configured to enable access to parts of the at least one media content based on the one or more tags.

According to a particular embodiment, the distributed storage is configured to stream the parts of the at least one media content based on the one or more tags.

It is to be understood that embodiments of the system can include structural components that can be configured to perform processing steps according to any one of the embodiments of the method in any combination. Likewise, embodiments of the method can define processing steps that reflect structural components or functional components of the system according to any one of the embodiments of the method in any combination.

BRIEF DESCRIPTION OF THE SEVERAL VIEWS OF THE DRAWINGS

The specific features, aspects and advantages of the present disclosure will be better understood with regard to the following description and accompanying drawings where:

FIG. 6 shows a user management area of a media platform according to one or more embodiments of the present disclosure.

DETAILED DESCRIPTION

In the following description, reference is made to drawings which show by way of illustration various embodiments. Also, various embodiments will be described below by referring to several examples. It is to be understood that the embodiments may include changes in design and structure without departing from the scope of the claimed subject matter.

Figure 1:
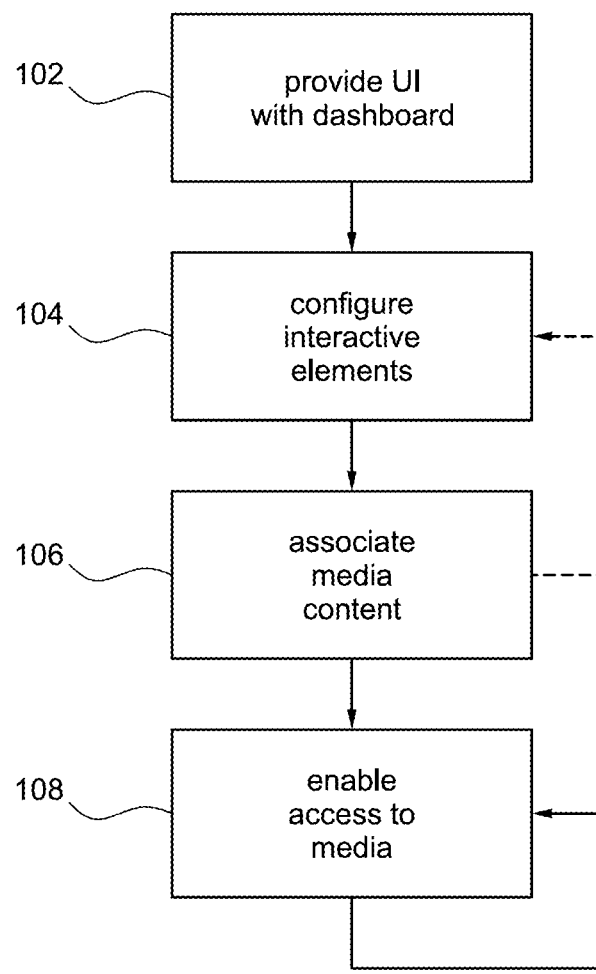
FIG. 1 shows a flowchart of a method for providing structured access to media content on a media platform according to one or more embodiments of the present disclosure.

FIG. 1 shows a flowchart of a method for providing structured access to media content on a media platform according to one or more embodiments of the present disclosure.

The method 100 may be implemented by one or more server devices that provides the media platform. Media platforms, as specified by one or more embodiments of the present disclosure may represent online services or cloud-based services, as well as user networks, online platforms, online systems, communication and networking sites, and other systems and interfaces, which may be accessible via a network by a plurality of users operating client devices or other remote terminals. The media platforms may enable users to share online content within the online service and to participate in activities provided by the online service. For example, each user may be connected via a client device with at least one server hosting the online service. The respective server may provide the user with one or more interfaces that may be provided or displayed on the client device or terminal and allow the user to interact with the online service. For example, a server may generate a personalized page which may be rendered on the client device of the user. The user may apply any interaction technique available on his or her client device, such as mouse interaction, keyboard interaction, gesture recognition, or touch interfaces, and the interaction input may be transferred to the server where it may be further processed in order to initiate a certain action. Also, the input may be processed on the client device, in order to provide the server with commands or instructions on how to further proceed.

The method 100 may start with item 102 and provide a user interface including a dashboard with a plurality of interactive elements. The dashboard may also be referred to as a viewing area. The user interface may be generated by one or more server devices and may be accessible from remote client devices. Yet, it is to be understood that the techniques described herein may be implemented in various computing systems. Such systems generally involve the use of suitably-configured computing devices implementing a number of modules, each providing one or more operations needed to complete execution of such techniques. Each module may be implemented in its own way; all need not be implemented the same way. As used herein, a module is a structural component of a system which performs an operational role, however instantiated, which may be a portion of or an entire software element (e.g., a function of a process, a discrete process, or any other suitable embodiment). A module may comprise computer-executable instructions, and may be encoded on a computer storage medium. Modules may be executed in parallel or serially, as appropriate, and may pass information between one another using a shared memory on the computer on which they are executing, using a message passing protocol or in any other suitable way. Exemplary modules are described below carrying out one or more tasks, though it should be appreciated that the modules and division of tasks described is merely illustrative of the type of modules that may implement the exemplary techniques described herein, and that the present disclosure is not limited to being implemented in any specific number, division, or type of modules. In some implementations, all functionality may be implemented in a single module. Further, the modules are discussed below, for clarity, as all executing on a single computing device, though it should be appreciated that, in some implementations, the modules may be implemented on separate computing devices adapted to communicate with one another. For example, one computing device may be adapted to execute an identification module to identify available networks, and connection modules on other computing devices may retrieve information on available networks from the computing device prior to establishing a connection.

The dashboard of the user interface provided in item 102 may be configured with one or more interactive elements. The interactive elements may represent buttons, other graphical representations, links, and any other element or item on a dashboard that may be interacted with. Moreover, the dashboards can be a two-dimensional or a three-dimensional representation. In embodiments, the dashboard can be a graphical interface, an audio interface or a haptic interface, in any combination and/or with further modalities, and the present disclosure is not limited to a particular setup of the dashboard.

The method may proceed with item 104, wherein the plurality of interactive elements of the dashboard can be configured using a design area of the user interface. Access to the design area may be granted according to a role of a user operating the user interface. The user may log in to the media platform and may provide user credentials or other identification information that may be used to verify authorization of the user to access to media platform and assign a role to the user, which may be a pre-defined role that may specify permissions and/or restrictions for the logged in user. If the user has permissions to access the design area they can use the design area to configure the interactive elements of the dashboard.

In item 106, the same or a different user may operate the user interface to associate at least one of the plurality of interactive elements with at least one media content using an upload area of the user interface. Access to the upload area may be granted according to a role of a user operating the user interface. The role may specify permissions and/or restrictions of the user to access the upload area. Users having the permissions to access the upload area may upload the at least one media content from their terminal devices to the media platform. The media content may be pre-processed on the terminal device or client device of the user, such that the uploaded content already represents the final version of the media content. Moreover, the upload area may provide the user with editing functionality to adjust the uploaded media content, such as selecting start and end points in the media content, cropping of images, editing text within the media content, and the like. The uploaded media content may be stored on the one or more server devices providing the user interface of the media platform. Additionally or as an alternative, the media platform may determine a most suitable distributed storage device for caching, buffering and/or storing the uploaded and potentially edited media content for subsequent retrieval via the dashboard.

In a sequential processing order, the method may proceed with item 104, wherein a user may configure further interactive elements for further media content. However, it is to be understood that items 104 and 106 may also be performed in parallel and may be operated by different users of the media platform concurrently. In this embodiment, a user may configure interactive elements in item 104 and another user may associate already configured interactive elements with uploaded media content in item 106 in a parallel manner and without interrupting the design process of item 104.

The method 100 may proceed with item 108, where the media platform enables access to the media content using the plurality of interactive elements of the dashboard. Each interactive element can be used to provides access to the associated at least one media content. The same user, or at least one user operating items 104 and 106, or a different user may access the dashboard and interact with the plurality of interactive elements to retrieve the uploaded media content in a structured manner.

The method 100 provides for structured access to media content that may be individualized for groups of users or individual users. The interactive elements may be set up to specify areas of interest. The interactive elements can be freely placed on the dashboard to guide the user towards relevant content. The user experiencing the dashboards is provided with structured access using the specified interactive elements to various kinds of media content pre-selected and pre-configured for the group of users or individual users.

The dashboard can be accessed by a (closed) group of users, wherein each user of the group of users may be assigned a role. A role with lowest permissions may be a viewer role that may enable a respective user to view the dashboard and access the media content. Further users that do not belong to the group of users and that do not have an assigned role may be blocked from accessing the dashboard. Such a dashboard could also be referred to as a private dashboard. However, the dashboard could also be provided to any user irrespective of an assigned role. Such a dashboard could also be referred to as a public dashboard. Moreover, a user having respective permissions can also share a private dashboard with a user outside of group of users or a user without an assigned role. Sharing can be performed by distributing a link or any other suitable pointer or referencing structure enabling the recipient to access the private dashboard. The sharing can be limited in time and can be subject to a log in of the user or provision of further credentials by the user.

The methods 100 may end after processing in item 108. However, is to be understood that media platforms typically enable instantaneous access to media without interruption.

The one or more server devices implementing the method 100 may include processing servers that may be dedicated to the individual functionality of items 102, 104, 106, and 108. For example, since access to the design area and to the upload area is controlled using permissions as specified by respective roles of the logged in users, method steps 104 and 106 may be performed on dedicated management hardware in parallel. On the other hand, item 108 may be performed on distributed server hardware to enable instantaneous and direct access to a large group of users that may be potentially located in different geographical areas.

Figure 2:
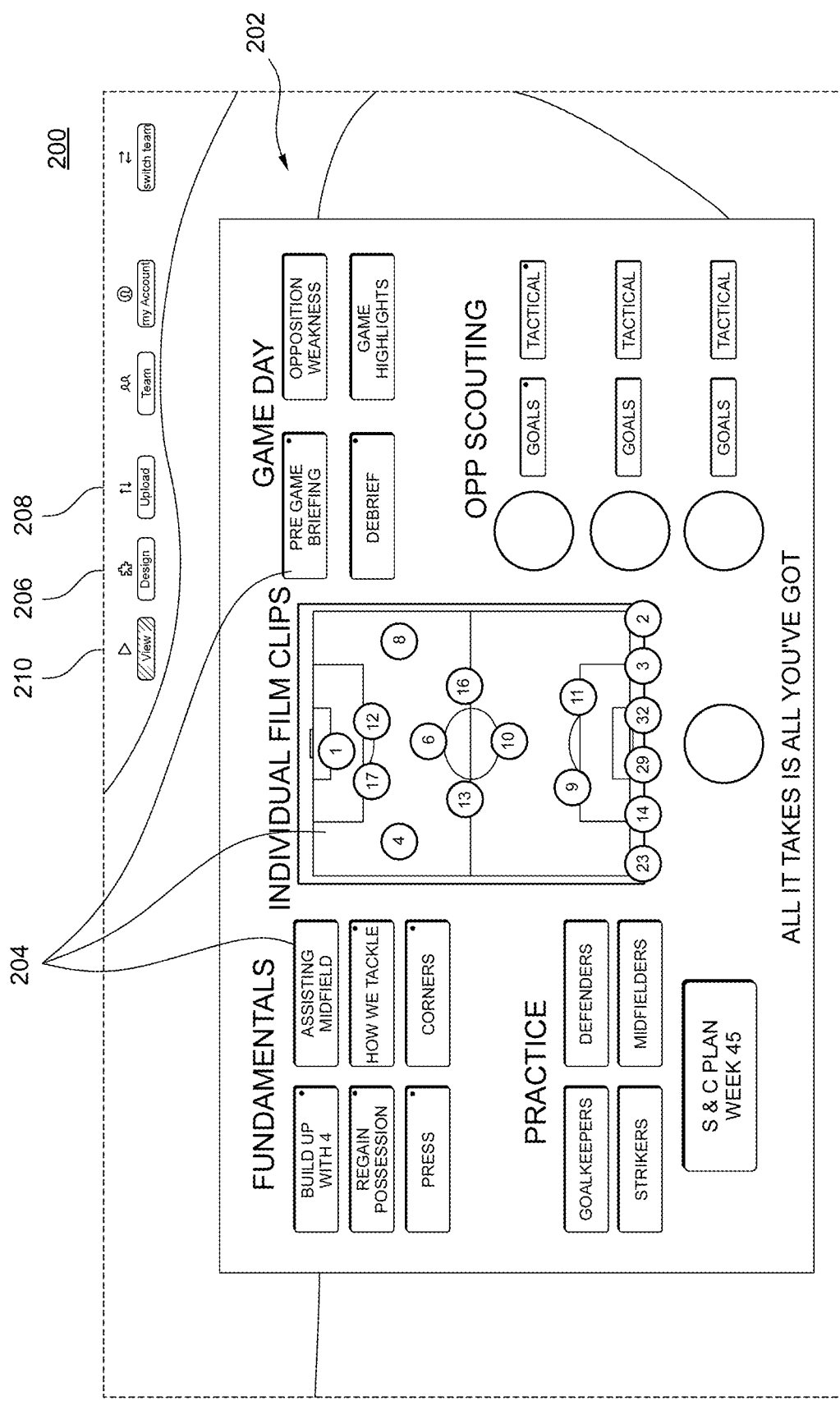
FIG. 2 depicts an example dashboard provided by a user interface of a media platform according to one or more embodiments of the present disclosure.

FIG. 2 depicts an example dashboard provided by a user interface of a media platform according to one or more embodiments of the present disclosure. FIG. 2 shows the user interface 200 with a dashboard 202. The user interface 200 may be provided using the method 100 of FIG. 1. In particular, the user interface 200 may be generated by one or more server devices and may be provided to a user after the user has logged in to the media platform.

The dashboard 202 may include a plurality of interactive elements 204. The dashboard 202 may include one or more background images and other audio/visual items or elements. The user interface 200 may provide further interactive elements 206, 208, 210. Interactive element 206 may enable access to a design area. Interactive element 208 may enable access to an upload area 208. Interactive element 210 may be highlighted to indicate that the user has navigated to the dashboard 202. Interactive element 210 will be further described in relation to FIGS. 3 and 4.

A user operating the user interface 200 may interact with any one of the plurality of interactive elements 204 to access media content associated with the individual interactive elements 204.

By interacting with item 206, a user may be granted access to a design area in order to adapt or adjust the dashboard 202. This may trigger functionality similar to item 104 of the method 100 of FIG. 1. Further details are discussed below with regard to FIG. 3.

By interacting with item 208, a user may be granted access to an upload area in order to upload media content and associate the media content with the interactive elements 204 presented on the dashboard 202. This may trigger functionality similar to item 106 of the method 100 of FIG. 1. Further details are discussed below with regard to FIG. 4.

In the example shown in FIG. 2, a dashboard 202 may be set up for a sports activity. For example, coaching staff may set up the dashboard 202 to structure available media content for training or coaching purposes. As shown in FIG. 2, the dashboard 202 may include basic media content, media content related to practice, and/or media content related to an individual match or positions or tasks of team members. Any other structure of the interactive elements can be used in order to provide a structured access to the media content. It is to be understood that the dashboard and/or at the media content can be related to other areas, such as the medical area, or any other application areas that require a structured access to media content as required for instructing, constructing, or other purposes.

Figure 3:
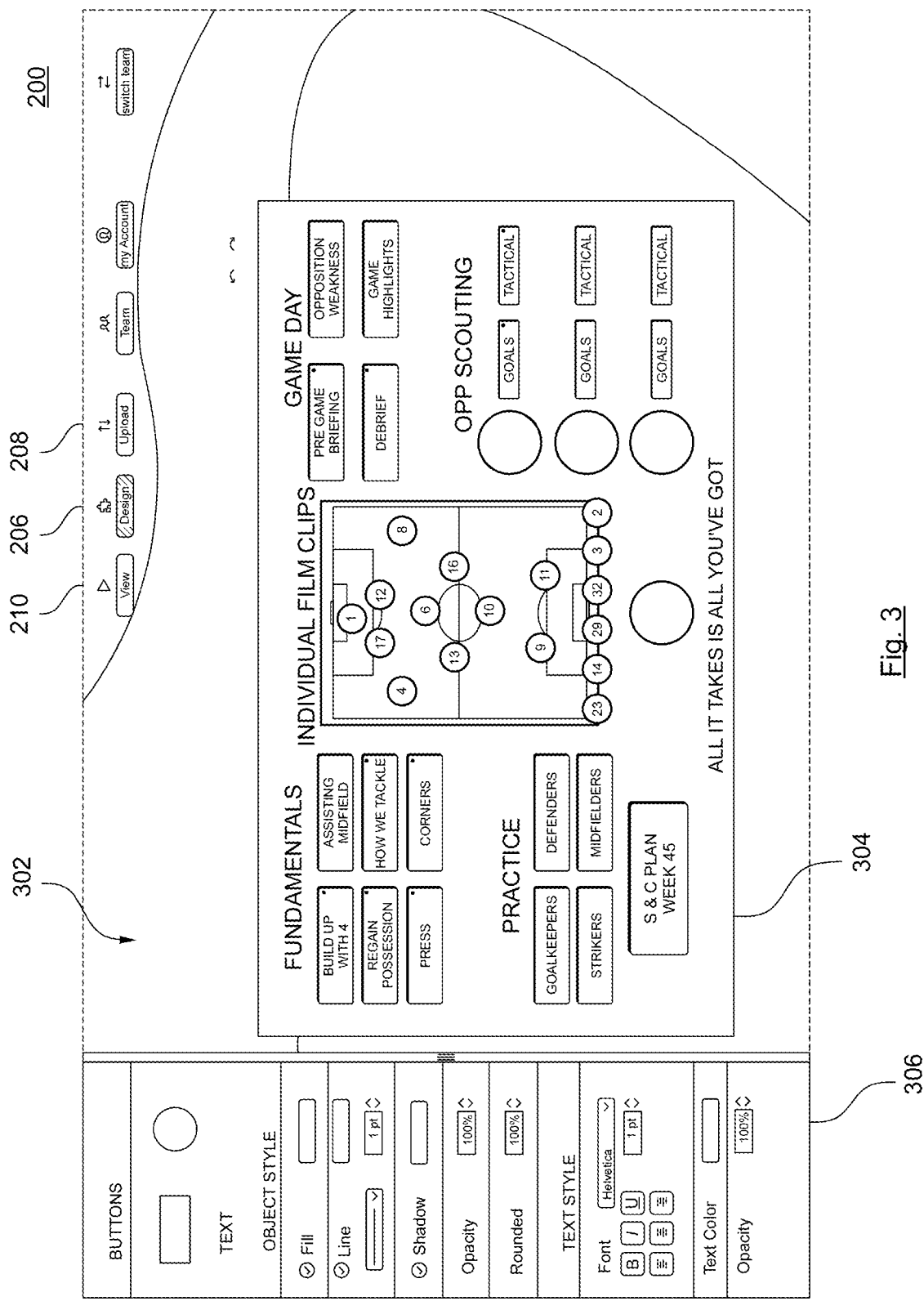
FIG. 3 shows an example design area of a user interface of a media platform according to one or more embodiments of the present disclosure.

FIG. 3 shows an example design area of a user interface of a media platform according to one or more embodiments of the present disclosure. FIG. 3 may represent a user interface of a media platform that may be linked to the user interface of the media platform as presented in FIG. 2. Thus, the same reference numerals have been used for corresponding items. When starting at the user interface 202 of FIG. 2, a user clicking on or otherwise interacting with the interactive element 206 may be presented with the design area 302 as shown in FIG. 3. This may be indicated by highlighting the interactive element 206 in FIG. 3.

The design area 302 may enable a configuration of a dashboard with interactive elements. The design area 302 may include a section 304 providing a preview of the configured interactive elements and which may enable a placement of interactive elements in a drag and drop manner or according to any other suitable interaction concept. The design area 302 may further include a section 306 that provides access to parameters of the interactive elements in section 304. The design area 302 may enable placement of individual interactive elements, such as buttons, text, images, and other audio/visual objects, elements or items on the preview section 304, which may be selected and adjusted in section 306 and subsequently placed on the preview of the dashboard in section 304. For example, a button, text, or an image may represent an interactive element on the dashboard. When selecting an image, the user may specify or upload a bitmap or an image, which may be subsequently placed on the preview of the dashboard in section 304.

Section 306 may enable a selection of parameters, such as an object style, text style, placement, size, shape and other parameters, in any combination, to define the appearance of the dashboard. Parameters may include one or more of coordinates, color, shape, filters, interactive properties, and time constraints, in any combination. Parameters may further include interactive components and timing components.

For example, individual interactive elements may be activated and/or deactivated during periods of time or on particular days. Moreover, the design area 302 may enable a specification of interactivity of the interactive elements, which may include presentation of further context menus, modalities for presenting the interactive elements, such as audio, video, haptics, and the like, and dimensionality of the interactive element, such as 2D, 3D or the like. This may enable a setup of a dashboard for a two- or three-dimensional environment and/or an immersive environment.

The design area 302 may include further interactive elements 206, 208, and 210 similar to corresponding interactive elements on the dashboard 202 of FIG. 2. The user may be informed that the design area is active by highlighting the interactive element 206.

By interacting with interactive element 208, a user may be forwarded to an upload area in order to upload media content and associate the media content with the designed interactive elements. This may trigger functionality similar to item 106 of the method 100 of FIG. 1. Further details are discussed below with regard to FIG. 4.

By interacting with interactive element 210, a user may be forwarded to the dashboard to view media content associated with the interactive elements. This may trigger functionality similar to item 108 of the method on a note of FIG. 1. Further details are discussed with regard to FIG. 2.

The design area 302 may be presented to a user in parallel to the dashboard 202 as shown in FIG. 2, which may be presented to another user. Any changes to the interactive elements executed in the design area 302 may be directly presented on the dashboard 202. Hence, the design area 302 may be operated by a user while the same or other users can access the dashboard as shown in FIG. 2.

Figure 4:
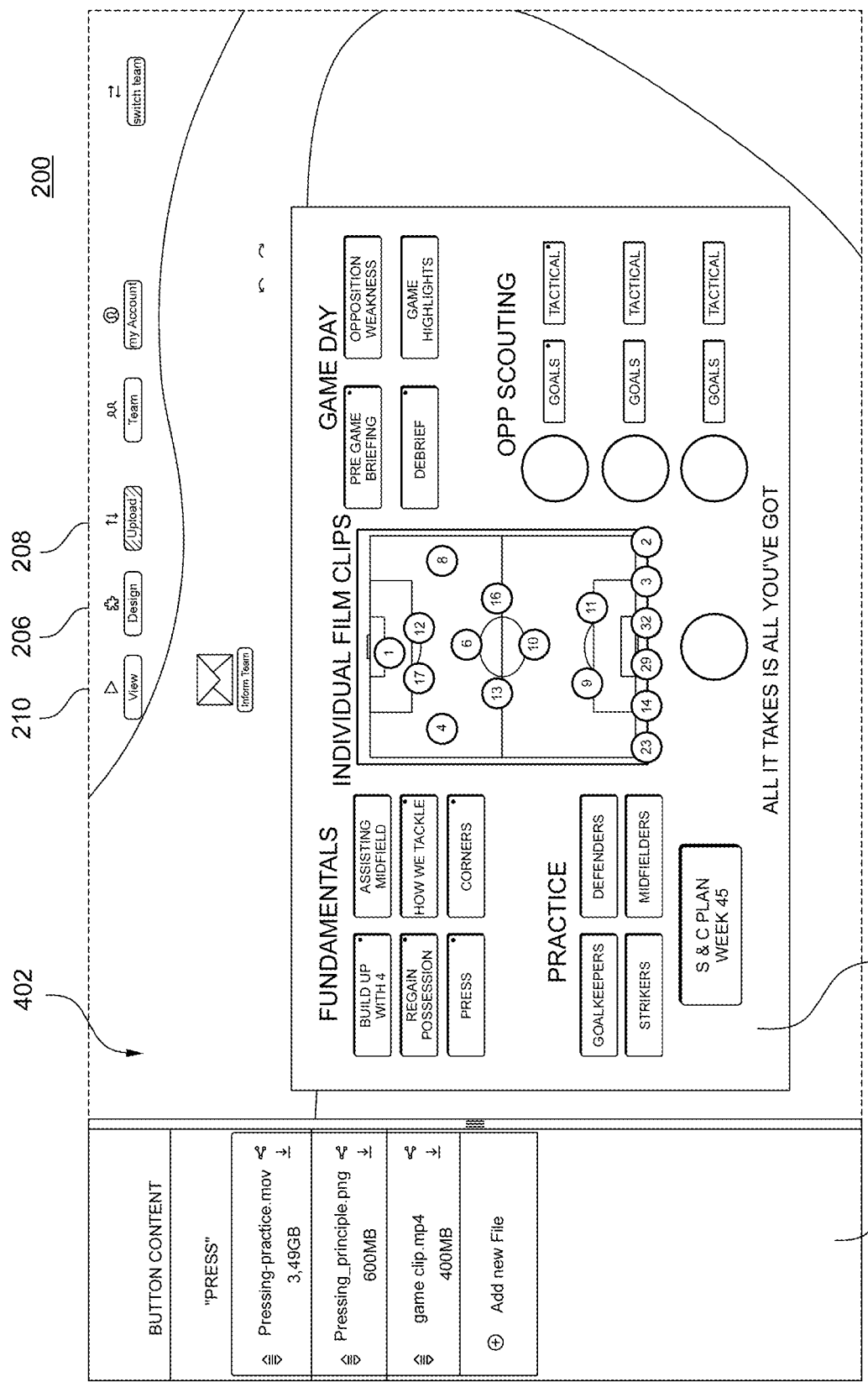
FIG. 4 illustrates an example upload area of a user interface of a media platform according to one or more embodiments of the present disclosure.

FIG. 4 illustrates an example upload area of a user interface of a media platform according to one or more embodiments of the present disclosure. FIG. 4 may represent a user interface of a media platform that may be linked to the user interfaces of the media platform as presented in FIGS. 2 and 3. Thus, the same reference numerals have been used for corresponding items. When starting at the user interface 202 of FIG. 2 or 3, a user clicking on or otherwise interacting with the interactive element 208 may be presented with the upload area 302 as shown in FIG. 4.

The upload area 402 may include a section 404, which may represent a preview of the interactive elements 204 of the dashboard 202, and another section 406, that may list uploaded media content and enable upload of further media content for individual interactive elements. A user may select an interactive element in section 404 and may associate the selected interactive element with one or more of the uploaded media content as shown in section 406. Section 406 may also be associated with selected interactive elements and may display media content associated with the selected interactive element. The order of the displayed media content in section 406 may define a queue of media content or an order for viewing of the media content when the associated interactive element is interacted with on the dashboard 202. Section 406 may be used to change the order of the displayed media content by interacting with respective buttons or items related to the individual media content, for example, by selecting an up or down button that may move the media content up or down one or multiple position in the displayed queue or order of media content. This may directly affect the order in which the media content is presented for the associated interactive element.

For each uploaded media content, section 406 may include a button or another interactive element (not shown) that may provide a link to an analysis component or an analysis service. The annotation component may generate one or more tags to annotate the media content, as described in embodiments of the disclosure. Hence, by interacting with the button or the other interactive element, uploaded media content may be used to generate annotated media content. Subsequently, the interactive elements may be further configured to provide access to portions of the media content according to one or more tags that have been generated by the analysis component or analysis service.

Section 406 may further include a button or another interactive element (not shown) that may set the selected interactive element to an exclusive mode. A user having respective permissions, such as a user having administrator rights or having a role that grants administrator rights, may associate the selected interactive element with one or more of the uploaded media content and (individually or for all uploaded media content) specify that the associated media content is intended for particular users or groups of users, thereby setting individual interactive elements to the exclusive mode. Different associated media content items can be specified for different groups of users or individual users.

The upload area 402 may include further interactive elements 206, 208, and 210 similar to corresponding interactive elements on the dashboard 202 of FIG. 2. The user may be informed that the upload area is active by highlighting interactive element 208.

By interacting with interactive element 206, a user may be forwarded to a design area in order to design the dashboard. This may trigger functionality similar to item 104 of the method 100 of FIG. 1. Further details are discussed with regard to FIG. 3.

By interacting with interactive element 210, a user may be forwarded to the dashboard to view media content associated with the interactive elements. This may trigger functionality similar to item 108 of the method on a note of FIG. 1. Further details are discussed with regard to FIG. 2.

The upload area 402 may be presented to a first user in parallel to the dashboard 202 as shown in FIG. 2 and/or the design area 302 as shown in FIG. 3, which may be presented to other users at the same time. Any uploaded media content and respective association with the interactive elements may be directly presented on the dashboard. Hence, the upload area 402 may be operated by a user while the same or other users access the dashboard as shown in FIG. 2 and/or the design area 302 as shown in FIG. 3.

In the example embodiments of FIGS. 2 to 4, the design area 302 and the upload area 402 include a preview of the dashboard 202 that can be used to place or arrange the interactive elements 204 in the section 304 of the design area 302 and/or to assign media content to the interactive elements 204 in the section 404 of the upload area 402. Any amendments performed via sections 304, 404 can be directly reflected on the dashboard 202.

In one example embodiments, which may represent another perspective on the technology presented in FIGS. 2 to 4, the media platform may provide a dashboard, wherein the functionality of the dashboard is changing in response to interaction with interactive elements 206, 208, 210. According to the example embodiment, FIG. 2 may represent a viewing area including the dashboard, wherein the dashboard has the functionality to enable access to media content by interacting with the interactive elements 204. According to the example embodiment, FIG. 3 may represent a design area including the dashboard, wherein the dashboard has the functionality to enable placement and management of the interactive elements 204 on the dashboard. According to the example embodiment, FIG. 4 may represent an upload area including the dashboard, wherein the dashboard has the functionality to manage assignment of uploaded media content to the interactive elements 204 on the dashboard. Thus, any modifications or changes to the dashboard are directly set to a central instance of the dashboard and available to all users of the media platform. It is to be understood that the example embodiment reflect a different view on the technology of FIGS. 2 to 4 and can include functional and structural aspects as disclosed with regard to any one of FIGS. 2 to 4.

Figure 5:
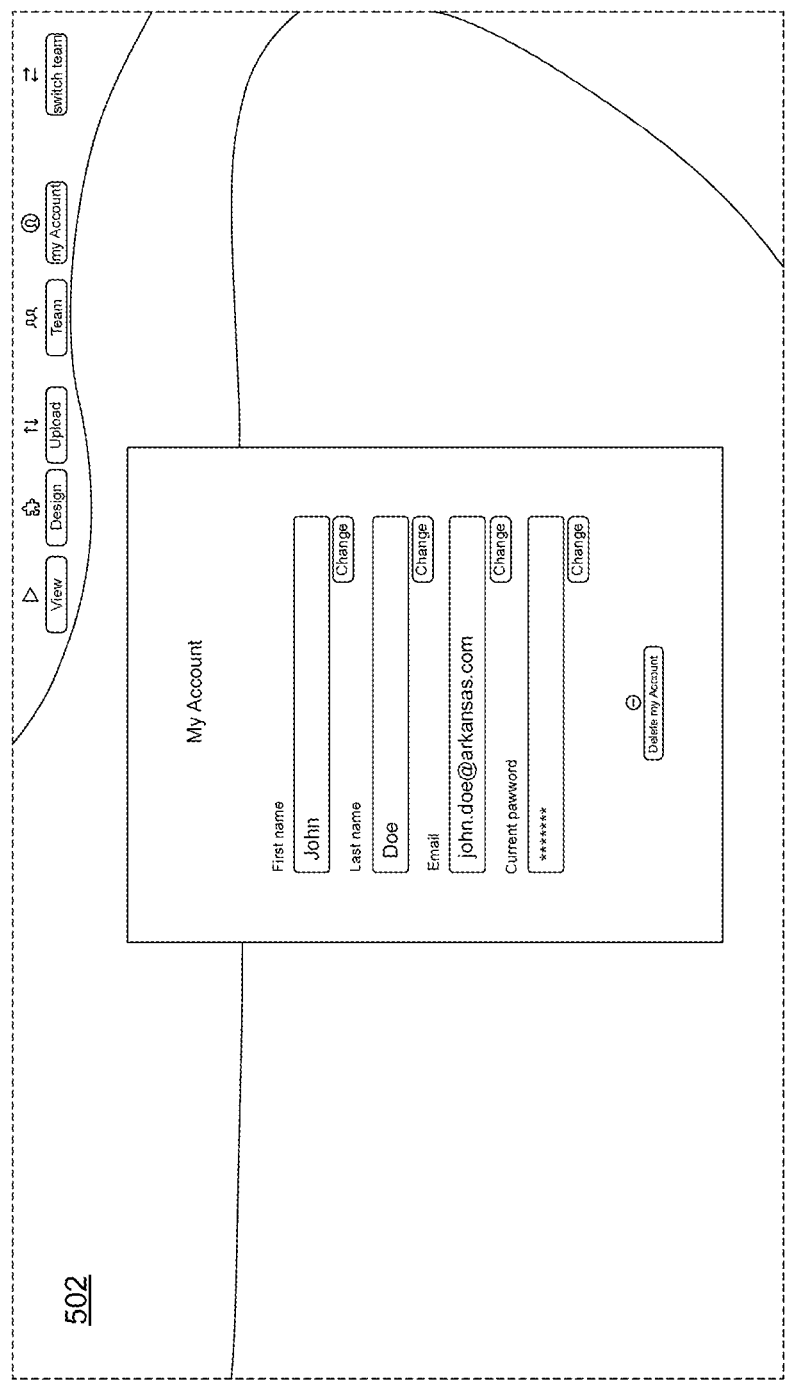
FIG. 5 shows an example user area of a media platform according to one or more embodiments of the present disclosure.

FIG. 5 shows an example of a user area of a media platform according to one or more embodiments of the present disclosure. FIG. 3 may represent a user interface of a media platform that may be linked to the user interfaces of the media platform as presented in FIGS. 2 to 4.

The user area 502 may be accessible by interacting with respective interactive elements on the dashboard 202, the design area 302, and/or the upload area 402 of FIGS. 2 to 4, respectively. The user area 502 may enable a specification of personal data, such as a name, a nickname or username, birthday, contact data, user credentials, and the like, in any combination. The user may change the personal data. Moreover, the user may be informed about their role and other permissions and/or restriction within the media platform.

Figure 6:
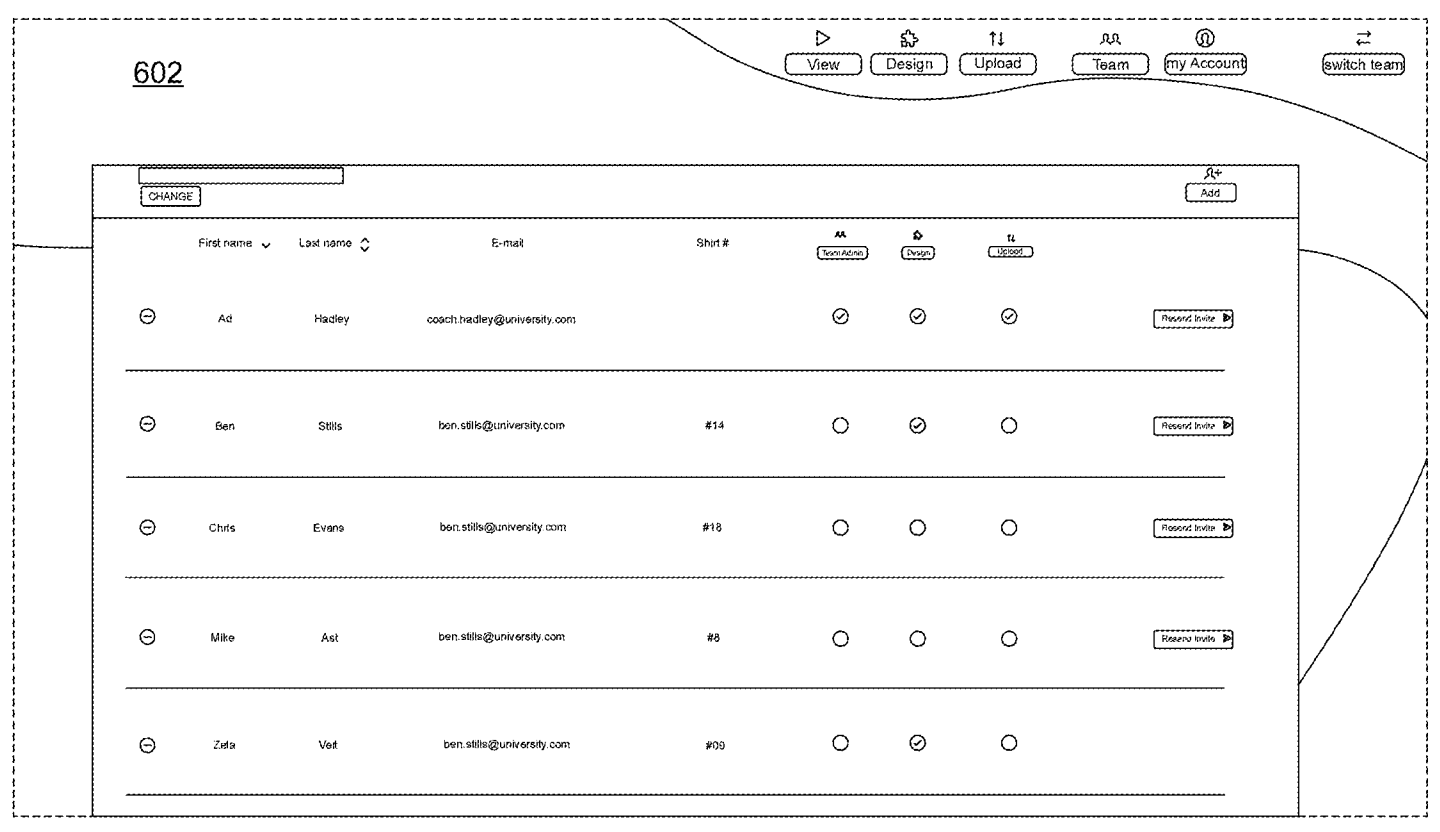

A corresponding role can be set by a user having respective rights in the user management area, as shown in FIG. 6. The user management area 602 may be part of a user interface of a media platform according to embodiments of the present disclosure. FIG. 6 may represent a user interface of a media platform that may be linked to the user interfaces of the media platform as presented in FIGS. 2 to 5. The user management area 602 may be accessible by interacting with respective interactive elements on the dashboard 202, the design area 302, the upload area 402 and/or the user area 502 of FIGS. 2 to 4, respectively.

The user management area 602 may list users or members of the media platform for which the dashboard is designed. Each of the users may be assigned a particular role, which may specify permissions and/or restrictions within the media platform. The role may include an administrator role, a designer role, an uploader role, and/or a viewer role in any combination that may specify permissions to access the dashboard 202 or other areas of the media platform, including the design area 302, the upload area 402, the user area 502, the user management area 602 and the dashboard of the media platform, as shown in FIGS. 2 to 6. The administrator role may enable the user to access all areas of the media platform, manage users, assign roles to users, share private dashboards, and the like, in any combination. The administrator role may grant the highest privileges and permissions to a user. The designer role may enable the user to access the design area 302, the upload area 402, the user area 502, and the dashboard of the media platform. The uploader role may enable the user to access the upload area 402, the user area 502, and the dashboard of the media platform. The viewer role may enable the user to access the user area 502 and the dashboard of the media platform. The viewer role may grant the lowest privileges and permissions to a user.

Both the user area 502 and the user management area 602 shown in FIGS. 5 and 6, respectively, may include respective interactive elements that may enable direct access to the dashboard 202, the design area 302, or the upload area 402 and the respective other user management area 602 or user area 502, respectively.

Regarding FIGS. 2 to 6, interactive elements 206, 208, 210 may be presented according to a role of a user setting respective permissions of the user. If the user does not have permissions to access a respective area, the corresponding interactive element 206, 208, 210 may be deactivated or inactive or may be hidden or may not be displayed or otherwise presented. If an interactive element 206, 208, 210 is inactive, the appearance of the interactive element 206, 208, 210 may change.

The embodiments shown in FIGS. 2 to 6 may refer to the same media platform and may depict components of the user interface of the media platform to enable direct and structured access to media content, which is prepared for a dedicated audience in an interactive manner. However, it is to be understood that the embodiments shown in FIGS. 2 to 6 may refer to different embodiments of the media platform or other media platforms within the scope of the present disclosure and that the media platform may include further areas or other areas in any combination. The embodiments shown in FIGS. 2 to 6 are not limiting for the other embodiments as shown in FIGS. 2 to 6.

Figure 7:
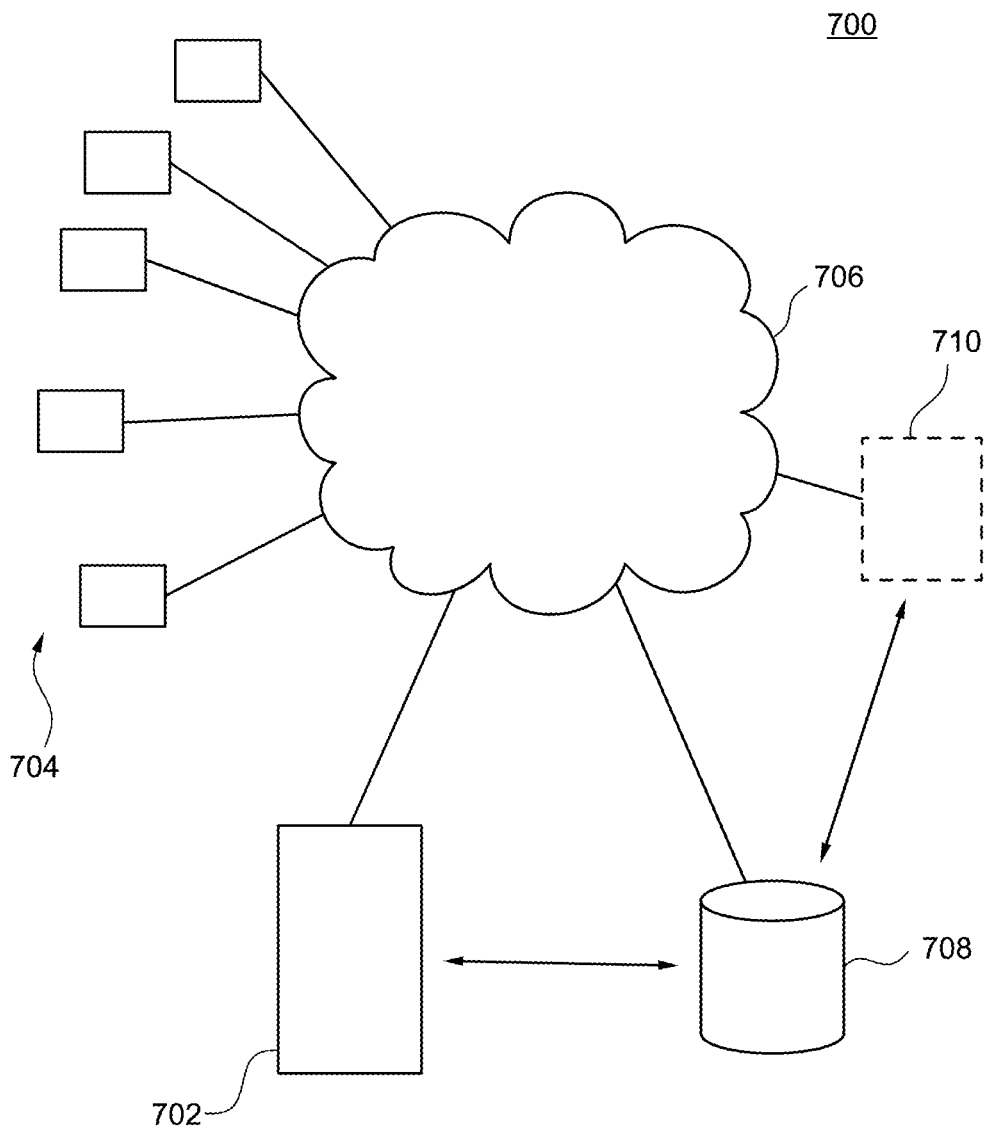
FIG. 7 illustrates a schematic view on a system according to one or more embodiments of the present disclosure.

FIG. 7 illustrates a schematic view on a system according to one or more embodiments of the present disclosure.

The system 700 may host and/or implement a media platform that provides access to media content. The system 700 may comprise a server device 702 that implements the media platform. The system 700 may also include a plurality of server devices and may load balance processing on the plurality of server devices. The server device 702 is depicted for illustrative purposes only. The server device 702 may be accessed by one or more client devices 704, that may be operated by different users. The client devices 704 may also be referred to throughout this disclosure as terminal devices. Any suitable computer and device can serve as a client or terminal device. For example, the client devices 704 may include personal computers, laptops, pads, smart phones, smart watches, and the like. The client devices 704 may include a communication interface (not shown) that interconnects the client devices with a network 706, which provides access to the server device 702.

The server device 702 is configured to provide a user interface including a dashboard with a plurality of interactive elements to the client devices 704. Each of the client devices 704 is capable of enabling a user to configure the plurality of interactive elements of the dashboard using a design area of the user interface, if the user has respective permissions. Hence, access to the design area is granted by the server device 702 according to a role of the user operating the user interface. Moreover, each of the one or more client devices 704 is capable of enabling a respective user to associate at least one of the plurality of interactive elements with at least one media content using an upload area of the user interface, if the user has respective permissions. Hence, access to the upload area is granted by the server device 702 according to a role of the user operating the user interface. Having the respective permissions, the at least one media content is uploaded from the client device 704 operated by the user to the media platform operated by the server device 702.

The server device 702 is further configured to enable access to the media content using the plurality of interactive elements of the dashboard, wherein each interactive element provides access to the associated at least one media content. Accordingly, the user operating the client device 704 may access the media platform implemented by the server device 702 to access the dashboard with interactive elements to retrieve media content associated with the respective interactive elements.

The system 700 may further comprise a distributed storage 708 which may store uploaded media content. The distributed storage 708 may provide the media content for download and may further pre-process the media contents to enable streaming of at least parts of the media content responsive to a request of at least one client device. After uploading of the media content via the server device 702, the server device 702 may either directly or via the network 706 transfer the uploaded media content to the distributed storage 708. The media content may also be directly uploaded to the distributed storage 708 from the respective client device 704.

The system 700 may further comprise an analysis component 710. The analysis component 710 may be configured to analyze media content stored on the server device 702 or on distributed storage 708 and provide one or more tags specifying at least parts of the media content. Accordingly, the system 700 may enable upload of media content and a subsequent analysis using the analysis component 710 to derive one or more tags or other annotations, to create annotated media content. According to the one or more tags or other annotations and a respective association with one or more interactive elements of the dashboard provided by the media platform, the server device 702 may enable access to parts of the media content based on the one or more tags or other annotations.

It is to be understood that the analysis component 710 may be provided as a service, which may be accessible via the network 706. The service may also be triggered by users operating the one or more client devices 704 in order to generate annotated media content, which may be subsequently uploaded to the server device 702 and/or to the distributed storage 708. The analysis component 710 is optional and the present disclosure is not limited by the presence of the analysis component 710 or a respective service.

While some embodiments have been described in detail it is to be understood that the aspect of the disclosure can take many forms. In particular, the claimed subject matter may be practiced or implemented differently from the examples described and the described features and characteristics may be practiced or implemented in any combination. The embodiments shown herein are intended to illustrate rather than to limit the present disclosure.

The invention claimed is:

1. A computer-implemented method for providing structured access to media content on a media platform, wherein the media platform is provided by at least one server device, the method comprising:
   providing, by the server device to a client device, a user interface including a dashboard with a plurality of interactive elements, wherein the user interface is displayed on the client device;
   granting, by the server device, an access to a design area of the user interface, to a first user according to a role of the first user operating the user interface, wherein the design area of the user interface is used by the first user to configure the plurality of interactive elements of the dashboard;
   granting, by the server device, an access to an upload area of the user interface to a second user according to a role of the second user operating the user interface, wherein the upload area of the user interface is used by the second user to upload at least one media content;
   receiving, by the server device, the at least one media content uploaded from the client device;
   analyzing, by the server device, the at least one media content using an analysis component to generate one or more tags to annotate the at least one media content, wherein the one or more tags are used to filter the at least one media content to directly provide access to a plurality of portions of the at least one media content according to a selection of the one or more tags;
   associating, by the server device, a first interactive element of the plurality of interactive elements with the at least one media content using at least a first tag of the one or more tags, wherein the first interactive element provides an access to at least one first portion among the plurality of portions of the at least one media content specified by the first tag;
   associating, by the server device, a second interactive element of the plurality of interactive elements with the at least one media content using at least a second tag of the one or more tags, wherein the second interactive element provides an access to at least one second portion among the plurality of portions of the at least one media content specified by the second tag; and
   enabling, by the server device, a direct access to the plurality of portions of the at least one media content using the plurality of interactive elements of the dashboard, wherein each interactive element provides access to the associated at least one media content.

2. The computer-implemented method of claim 1, further comprising associating the first interactive element with at least another first tag of the plurality of tags, and associating the second interactive element with at least another second tag of the plurality of tags.

3. The computer-implemented method of claim 1, wherein the at least one of the media content is related to at least one sports activity and wherein the at least one media content includes annotated media content related to the at least one sports activity.

4. The computer-implemented method of claim 1, wherein the role includes one or more of an administrator role, a designer role, an uploader role, and a viewer role.

5. The computer-implemented method of claim 1, further comprising granting, by the server device, an access to the design area to the first user to specify one or more parameters related to the plurality of interactive elements using the design area, wherein the plurality of interactive elements are provided on the dashboard according to the one or more parameters, wherein the one or more parameters include one or more of coordinates, color, shape, filters, interactive properties, and time constraints.

6. The computer-implemented method of claim 1, wherein the at least one media content includes one or more of text documents, multimedia documents, images, audio data, video, and virtual reality content.

7. The computer-implemented method of claim 1, wherein the at least one media content includes media content and a data structure specifying the one or more tags.

8. The computer-implemented method of claim 1, further comprising providing, by the server device, a preview area upon detecting a user interaction with an interactive element among the plurality of interactive elements, the preview area listing one or more items indicating the at least one media content associated with the interactive element and enabling direct access to a respective media content.

9. The computer-implemented method of claim 8, wherein the interactive element is associated with a plurality of media content, the method further comprising generating a media stream including the plurality of media content, and providing the media stream to a user of the dashboard.

10. The computer-implemented method of claim 1, further comprising providing a further dashboard with a further plurality of interactive elements, the further plurality of interactive elements configured to provide access to the at least one media content associated with the plurality of interactive elements of the dashboard.

11. The computer-implemented method of claim 1, further comprising, for a user of the user interface, verifying an access authorization of the user based on the role to grant access to at least one of the dashboard, the design area, and the upload area.

12. One or more non-transitory computer-readable media storing instructions thereon, wherein the instructions, when executed by one or more computing devices, configure the one or more computing devices to perform a method for providing structured access to media content on a media platform, wherein the media platform is provided by a server device, the method comprising:
  providing, by the server device to a client device, a user interface including a dashboard with a plurality of interactive elements, wherein the user interface is displayed on the client device;
  granting, by the server device, an access to a design area of the user interface, to a first user according to a role of the first user operating the user interface, wherein the design area of the user interface is used by the first user to configure the plurality of interactive elements of the dashboard;
  granting, by the server device, an access to an upload area of the user interface to a second user according to a role of the second user operating the user interface, wherein the upload area of the user interface is used by the second user to upload at least one media content;
  receiving, by the server device, the at least one media content uploaded from the client device;
  analyzing, by the server device, the at least one media content using an analysis component to generate one or more tags to annotate the at least one media content, wherein the one or more tags are used to filter the at least one media content to directly provide access to a plurality of portions of the at least one media content according to a selection of the one or more tags;
  associating, by the server device, a first interactive element of the plurality of interactive elements with the at least one media content using at least a first tag of the one or more tags, wherein the first interactive element provides an access to at least one first portion among the plurality of portions of the at least one media content specified by the first tag;
  associating, by the server device, a second interactive element of the plurality of interactive elements with the at least one media content using at least a second tag of the one or more tags, wherein the second interactive element provides an access to at least one second portion among the plurality of portions of the at least one media content specified by the second tag; and
  enabling, by the server device, a direct access to the plurality of portions of the at least one media content using the plurality of interactive elements of the dashboard, wherein each interactive element provides access to the associated at least one media content.

13. A system, comprising:
  a server device providing a media platform;
  one or more client devices; and
  an analysis component,
  wherein the server device is configured to provide a user interface including a dashboard with a plurality of interactive elements to the one or more client devices and the user interface is displayed on the one or more client devices,
  wherein each of the one or more client devices enable a respective user to configure the plurality of interactive elements of the dashboard using a design area of the user interface, wherein an access to the design area is granted by the server device to a first user according to a role of the first user operating the user interface; and
  wherein the server device is configured to:
    grant an access to an upload area of the user interface to a second user according to a role of the second user operating the user interface, wherein the upload area of the user interface is used by the second user to upload at least one media content,
    receive the at least one media content uploaded from the one or more client devices;
    analyze the at least one media content using an analysis component to generate one or more tags to annotate the at least one media content, wherein the one or more tags are used to filter the at least one media content to directly provide access to a plurality of portions of the at least one media content according to a selection of the one or more tags;
    associate a first interactive element of the plurality of interactive elements with the at least one media content using at least a first tag of the one or more tags, wherein the first interactive element provides an access to at least one first portion among the plurality of portions of the at least one media content specified by the first tag;
    associate a second interactive element of the plurality of interactive elements with the at least one media content using at least a second tag of the one or more tags, wherein the second interactive element provides an access to at least one second portion among the plurality of portions of the at least one media content specified by the second tag; and
    enable a direct access to the plurality of portions of the at least one media content using the plurality of interactive elements of the dashboard, wherein each interactive element provides access to the associated at least one media content.

14. The system of claim 13, further comprising a distributed storage configured to store media content and stream at least parts of the media content responsive to a request of at least one client device.

15. The system of claim 13, wherein the distributed storage is configured to stream the parts of the at least one media content based on the one or more tags.

* * * * *